(12) United States Patent
Silver et al.

(10) Patent No.: US 7,987,118 B1
(45) Date of Patent: *Jul. 26, 2011

(54) METHOD, SYSTEM, AND COMPUTER READABLE MEDIUM FOR IDENTIFYING ERRONEOUS DUPLICATE ORDERS

(75) Inventors: Scott M. Silver, Seattle, WA (US); J. Gray Sandridge, Seattle, WA (US); Robert Lendvai, Seattle, WA (US); David I. Gellman, Seattle, WA (US); Diwakar Gupta, Redmond, WA (US); Stephane J. Jais, Paris (FR)

(73) Assignee: Amazon Technologies, Inc., Incline Village, NV (US)

( * ) Notice: Subject to any disclaimer, the term of this patent is extended or adjusted under 35 U.S.C. 154(b) by 792 days.

This patent is subject to a terminal disclaimer.

(21) Appl. No.: 11/946,756

(22) Filed: Nov. 28, 2007

Related U.S. Application Data

(63) Continuation of application No. 10/853,580, filed on May 24, 2004, now Pat. No. 7,318,043.

(51) Int. Cl.
G06F 17/30 (2006.01)
G06Q 30/00 (2006.01)

(52) U.S. Cl. .................. 705/26.81; 705/26.8; 705/26.82

(58) Field of Classification Search .............. 705/26–27, 705/26.1–27.2
See application file for complete search history.

(56) References Cited

U.S. PATENT DOCUMENTS

| | | | |
|---|---|---|---|
| 5,754,981 A | 5/1998 | Veeneman et al. ............. 705/26 |
| 5,898,594 A | 4/1999 | Leason et al. ............ 364/479.01 |
| 5,970,474 A | 10/1999 | LeRoy et al. .................. 705/27 |
| 6,249,774 B1 * | 6/2001 | Roden et al. .................... 705/28 |
| 6,556,975 B1 | 4/2003 | Wittsche ......................... 705/26 |
| 6,917,922 B1 | 7/2005 | Bezos et al. .................... 705/27 |
| 7,194,417 B1 * | 3/2007 | Jones ............................... 705/5 |
| 2002/0026423 A1 * | 2/2002 | Maritzen et al. ............... 705/56 |
| 2002/0133415 A1 | 9/2002 | Zarovinsky .................... 705/26 |
| 2002/0143655 A1 * | 10/2002 | Elston et al. ................... 705/26 |
| 2003/0163390 A1 | 8/2003 | Yang .............................. 705/27 |

(Continued)

FOREIGN PATENT DOCUMENTS

WO WO 00/39738 7/2000

OTHER PUBLICATIONS

"A picture perfect copyright guard—Airlines find matchmaker". Jun. 2003. Security Management online.*

(Continued)

Primary Examiner — William Allen
(74) Attorney, Agent, or Firm — Seed IP Law Group PLLC

(57) ABSTRACT

A method, system, and computer-readable medium for assisting in automatically identifying and handling erroneous orders is described. In some situations, an automatic identification is made of received orders from users that are duplicates of one or more other orders recently placed by those users. When orders are identified as being potentially erroneous, fulfillment of those orders may be delayed while automatically querying the users to obtain manual confirmation to continue with the order fulfillment. In other situations, other types of orders are analyzed, orders are identified as being potentially erroneous in other ways, and such orders are handled in ways other than based on querying for a manual confirmation or rejection response. This abstract is provided to comply with rules requiring an abstract, and it is submitted with the intention that it will not be used to interpret or limit the scope or meaning of the claims.

64 Claims, 12 Drawing Sheets

U.S. PATENT DOCUMENTS

2005/0015336 A1    1/2005  Yeates et al. .................... 705/40
2005/0049925 A1    3/2005  Kataoka et al. ................. 705/26

OTHER PUBLICATIONS

"Clearcommerce provides superdrug with healthy transactions". Jun. 15, 2001. M2 Presswire.*

U.S. Appl. No. 09/528,087, filed Mar. 17, 2000, Song.

"Airlines Find Matchmaker." http://www.securitymanagement.com/library/001449.html. Jun. 2003. Retrieved Mar. 22, 2007, 4 pages.

Airline Automation, Inc., "Predator," retrieved Aug. 5, 2005, from http://www.airauto.com/aai/predator/index.htm, 7 pages.

Airline Automation, Inc., "Super Dupe Snooper$^{SM}$," retrieved Aug. 5, 2005, from http://www.airauto.com/aai/dupesnoop/index.htm, 2 pages.

"Clearcommerce Provides Superdrug with healthy transactions." M2 Presswire. Jun. 15, 2001. Retrieved via Proquest Database, Mar. 22, 2007, 2 pages.

"Evergreen Internet Launches the First Internet Gift Registry With Their Direct Marketing Partners." PR Newswire. Oct. 28, 1996. Retrieved via Dialog Database, Sep. 9, 2007, 3 pages.

Henderson, D., "Turning Bookings Into Passengers," *Air Transport World*, Oct. 1999, 2 pages.

Midwest Library Service—home page, "Inter ACQ™," retrieved Aug. 5, 2005, from http:/www.midwestls.com/, 1 page.

Midwest Library Service, "Inter ACQ™—Internet based Title Notification, Selection and Ordering," retrieved Aug. 5, 2005, from http://www.midwestls.com/Brochure/interacqtext.htm, 2 pages.

Midwest Library Service, "What's New," retrieved Aug. 5, 2005, from http:/www.midwestls.com/Brochure/whattext.htm, 4 pages.

NetGift Registry Incorporated, "NetGift Registry—Main," retrieved Feb. 23, 2000, from http://www.netgift.com/cgi-bin/ngr/index.jsp, 2 pages.

"Reminder/Gifted Solutions Announces Merchant and Portal Partners Using its New Gift Services Engine at Internet Commerce Expo This Week," *Business Wire*, Oct. 19, 1999, 2 pages.

Sabre Airline Solutions™, "Revenue Integrity Management," retrieved Aug. 5, 2005, from http://www.sabreairlinesolutions.com/products/operation/pdfs/SabreSonic_Rev_Integrity_Mgmt.pdf, 8 pages.

"Smart Ticketing," *Regional Airline World*, 20(4):25, 26, 28, May 2003, 3 pages.

WishClick, Inc., "Welcome to WishClick!," retrieved Feb. 23, 2000, from http://www.wishclick.com, 1 page.

WishClick, Inc., "Manage Idea List," retrieved Feb. 23, 2000, from http://www.wishclick.com/ideaList/, 1 page.

* cited by examiner

110 — Example Shopping Cart Order Submission Preview

Please review the information below, then select "Place Your Order" to submit your order — 110a

ORDER SUMMARY

| | |
|---|---|
| Items: | $35.00 |
| Shipping & Handling: | $5.95 |
| Total Before Tax: | $40.95 |
| Estimated Tax: | $3.28 |
| ORDER TOTAL: | $44.23 |

— 110b

▶ Place Your Order — 110c

Payment Method: [Change] — 110d
MasterCard: ***-12345
Exp: 12/2006

Shipping to: [Change] — 110f
Jane Doe
1234 Main St.
Anytown, ST 12345

Billing Address: [Change] — 110e
Jane Doe
1234 Main St.
Anytown, ST 12345

Shipping Options:

Choose a shipping speed:
o Free Super Saver Shipping
● Standard Shipping
o Two Day Shipping (get it Tuesday, January 15!)
o One Day Shipping (get it Monday, January 14!)

— 110g

Choose a shipping preference:
● Group my items into as few shipments as possible (minimum 1)
o I want my items faster. Ship items as they become available. (there may be additional costs)

— 110h
— 110i

The following items will arrive in 1 shipment: — 110j
Estimated ship date for these items: January 16

Need to [Change quantities or delete]? — 110h

Book ABC
$12.00 – Quantity: 2 – Usually ships in 24 hours    Condition: New    Gift options: None [Change]

— 110k

CD BCD
$11.00 – Quantity: 1 – Usually ships in 24 hours    Condition: New    Gift options: None [Change]

*Fig. 1A*

130 — Example Duplicate Order Confirmation

130a

This is a duplicate order!
Jane, you just placed an order for these items a few minutes ago. Are you sure you want to place the same order again? Please use one of the buttons below to tell us what you'd like to do.

[ ▶ Place This Duplicate Order ] — 130b or

[ ▶ Cancel This Duplicate Order ] — 130c
(your original order will still be shipped;
we'll take you to Your Account to view
your order history)

---

Order Summary:

Book ABC
$12.00 – Quantity: 2 – Usually ships in 24 hours     Condition: New     Gift options: None

CD BCD
$11.00 – Quantity: 1 – Usually ships in 24 hours     Condition: New     Gift options: None Standard Shipping
Group items into as few shipments as possible (minimum 1)

Shipping to:

Jane Doe
1234 Main St.
Anytown, ST 12345

Billing Address:          Payment Method:
Jane Doe                      MasterCard: ***-12345
1234 Main St.                 Exp: 12/2006
Anytown, ST 12345

140 — Example Confirmation Of Potentially Erroneous Order

Your current order appears to potentially have been placed in error!
Jane, you previously placed a very similar order on January 3$^{rd}$ at 5:15pm. Please choose an action below to confirm what you'd like to do. ⎬ 140a

| ▶ Proceed To Place The Current Order In Addition To The Prior Order | ⎬ 140b or

| ▶ Proceed To Place The Current Order And Cancel The Prior Order | ⎬ 140c or

| ▶ Cancel The Current Order | ⎬ 140d

☐ Do not perform such order confirmation again ⎬ 140e

---

Prior Order Summary:

Book ABC
$12.00 – Quantity: 1      Condition: New      Gift options: None

CD BCD
$11.00 – Quantity: 1      Condition: New      Gift options: None

CD EFG
$11.00 – Quantity: 1      Condition: New      Gift options: None

Standard Shipping
Ship items as they become available.

Shipping to:

Jane Doe
1234 Main St.
Anytown, ST 12345

Billing Address:                        Payment Method:
Jane Doe                                    MasterCard: ***-12345
1234 Main St.                               Exp: 12/2006
Anytown, ST 12345

*150*     Example Duplicate Order Confirmation With Customer Feedback

This is a duplicate order!
Jane, you previously placed an order for these items. Are you sure you want to place the same order again? Please use one of the buttons below to tell us what you'd like to do.

▶ Place This Duplicate Order    ⎬ *150b* or

▶ Cancel This Duplicate Order    ⎬ *150c*

---

Please tell us about the action selected above: (it may help us perform better in the future)

When confirming to place the duplicate order: (select all that apply)
- ☐ I'm placing the current order to replace items from the prior order that have worn out.
- ☐ I'm placing the current order to replace items from the prior order that had problems.
- ☐ I'm placing the current order to have multiple copies of the items for myself.
- ☐ I'm placing the current order to have copies of newer versions of the items for myself.
- ☐ The prior order was for me, and I'm placing the current order for gift use.
- ☐ The prior order was for gift use, and I'm placing the current order for myself.
    ⋮

When canceling the duplicate order: (select all that apply)
- ☐ I had forgotten about the prior order.
- ☐ I was not sure if the prior order was placed due to [not seeing an order completion message ▼]
- ☐ I did not intend to place this order.
- ☐ I did not know about the prior order because another user sharing this account had placed it.

⎬ *150e*

⋮

Other comments: [⎯⎯⎯⎯⎯⎯⎯⎯⎯⎯⎯⎯⎯⎯⎯⎯⎯⎯⎯⎯⎯⎯] ⎬ *150f*

Preferences for future orders:
- ☐ Please [do ▼] show such confirmations when [all ▼] items in a current order were also [at least some of the ▼] items in a prior order that occurred [in the prior 20 minutes ▼] and was sent to [the same ▼] shipping address using [any ▼] shipping speed and [any ▼] item grouping shipping preference and [any ▼] payment source and [the same ▼] ordering method, and the number of copies of [each ▼] item in the current order [is the same as ▼] the number of copies of that item in the prior order.
- ☐ Please [do not ▼] show such confirmations when using the [single-action ▼] ordering method.
- ☐ Please [do ▼] show duplicate order warnings [before ▼] order completion.

Example Shopping Cart Order Submission Preview With Duplicate Order Warning

160

Please review the information below, then select "Place Your Order" to submit your order WARNING! Jane, you recently placed an order for these items, although with a different shipping speed than is currently selected. Are you sure you want to place the same order again? 160w

ORDER SUMMARY

| | |
|---|---|
| Items: | $35.00 |
| Shipping & Handling: | $5.95 |
| Total Before Tax: | $40.95 |
| Estimated Tax: | $3.28 |
| ORDER TOTAL: | $44.23 |

▶ Place Your Order
160c

Payment Method: [Change]
MasterCard: ***-12345
Exp: 12/2006

Shipping to: [Change]
Jane Doe
1234 Main St.
Anytown, ST 12345

Billing Address: [Change]
Jane Doe
1234 Main St.
Anytown, ST 12345

Shipping Options:

Choose a shipping speed:
○ Free Super Saver Shipping
● Standard Shipping
○ Two Day Shipping (get it Tuesday, January 15!)
○ One Day Shipping (get it Monday, January 14!)

Choose a shipping preference:
● Group my items into as few shipments as possible (minimum 1)
○ I want my items faster. Ship items as they become available. (there may be additional costs)

The following items will arrive in 1 shipment:    Need to [Change quantities or delete]?
Estimated ship date for these items: January 16

Book ABC
    $12.00 – Quantity: 2 – Usually ships in 24 hours      Condition: New      Gift options: None [Change]

CD BCD
    $11.00 – Quantity: 1 – Usually ships in 24 hours      Condition: New      Gift options: None [Change]

*Fig. 1F*

170 — Example Order Completion Message With Duplicate Order Warning

Thanks, Jane!
Your order is being processed, and you'll receive an email confirmation shortly.

IMPORTANT NOTICE! Please note that you recently placed a prior order for these items, although with a different shipping speed than was used for the current order. If you want to cancel the current order, please select the "Cancel your order" action below or access that functionality after selecting "View your account". — 170w

Review or edit your order:

View a summary of your order
Track your order status
Edit shipping and gift options — 170f
Cancel your order Make various changes in your account: [View your account]

Customers who bought items in your order also bought:

| | |
|---|---|
| Book CDE | $15.00 |
| Book DEF | $11.00 |
| CD EFG | $10.00 |
| DVD FGH | $15.00 |

Your recommendations:

| | |
|---|---|
| Book GHI | $25.00 |
| Book HIJ | $10.00 |
| DVD IJK | $10.00 |

*Fig. 1G*

METHOD, SYSTEM, AND COMPUTER READABLE MEDIUM FOR IDENTIFYING ERRONEOUS DUPLICATE ORDERS

CROSS-REFERENCE TO RELATED APPLICATION

This application is a continuation of co-pending U.S. patent application Ser. No. 10/853,580, filed May 24, 2004 and entitled "Automatically Identifying Erroneous Orders," which is hereby incorporated by reference in its entirety.

TECHNICAL FIELD

The following disclosure relates generally to ordering items, and more particularly to techniques for automatically identifying and handling erroneous orders.

BACKGROUND

The Internet comprises a vast number of computers and computer networks that are interconnected through communication links, with information being exchanged using various services such as electronic mail, FTP, Gopher, and the World Wide Web (also referred to as the "Web"). In addition to merely providing access to information, the Web has increasingly become a medium that is used to search for, shop for and order items (such as products and/or services) that are for purchase, rent, lease, license, trade, evaluation, sampling, etc. In many circumstances, a user can visit the Web site of a Web merchant (or a "Web store") or other electronic marketplace that sells one or more items. Once there, the user can view information about the items, give an instruction to place an order for one or more items, and provide information needed to complete the purchase (e.g., payment and shipping information).

After receiving an order for one or more items, a Web merchant then fulfills the order by providing the ordered items to the indicated recipient. Some product items may be available to be delivered electronically to a recipient (e.g., music over the Internet), while other product items (e.g., paperback books) may instead be delivered through physical distribution channels (e.g., a common carrier). Similarly, some service items may be provided electronically (e.g., providing email service), while others may be provided physically (e.g., performing cleaning services at the purchaser's house). The order fulfillment process typically used by Web merchants for product items that are to be physically provided shares similarities with other item ordering services that ship ordered items (e.g., catalog-based shopping, such as from mail-order companies).

Although such electronic shopping can provide many benefits, problems can still arise. For example, in some situations orders are placed by users in error. Such errors could occur, for example, if the user had previously attempted to place the same order, but was unaware that the prior attempt had been successful and so placed the same order again. This problem may occur due to the fact that communications over the Internet are inherently unreliable, for example, with the electronic marketplace having received and processed the order, but the user not having received a confirmation message that was sent from the electronic marketplace (e.g., due to an intermittent communication error). In other situations, such as when a user can place an order for one or more items with a single action, the user may inadvertently perform that single action without intending to cause an order to be placed. Other factors can similarly cause mistakes to occur with respect to placement of orders, such as when a user forgets that they had previously placed the same order, or when another user had previously placed the order on behalf of that user but without the knowledge of the user.

Thus, it would be beneficial to provide functionality to assist in identifying and eliminating erroneous orders, both for the benefit of users placing orders and for electronic marketplaces that fulfill the orders.

BRIEF DESCRIPTION OF THE DRAWINGS

FIGS. 1A-1G illustrate examples of techniques related to handling automatically identified potentially erroneous orders.

DETAILED DESCRIPTION

Figure 1B:
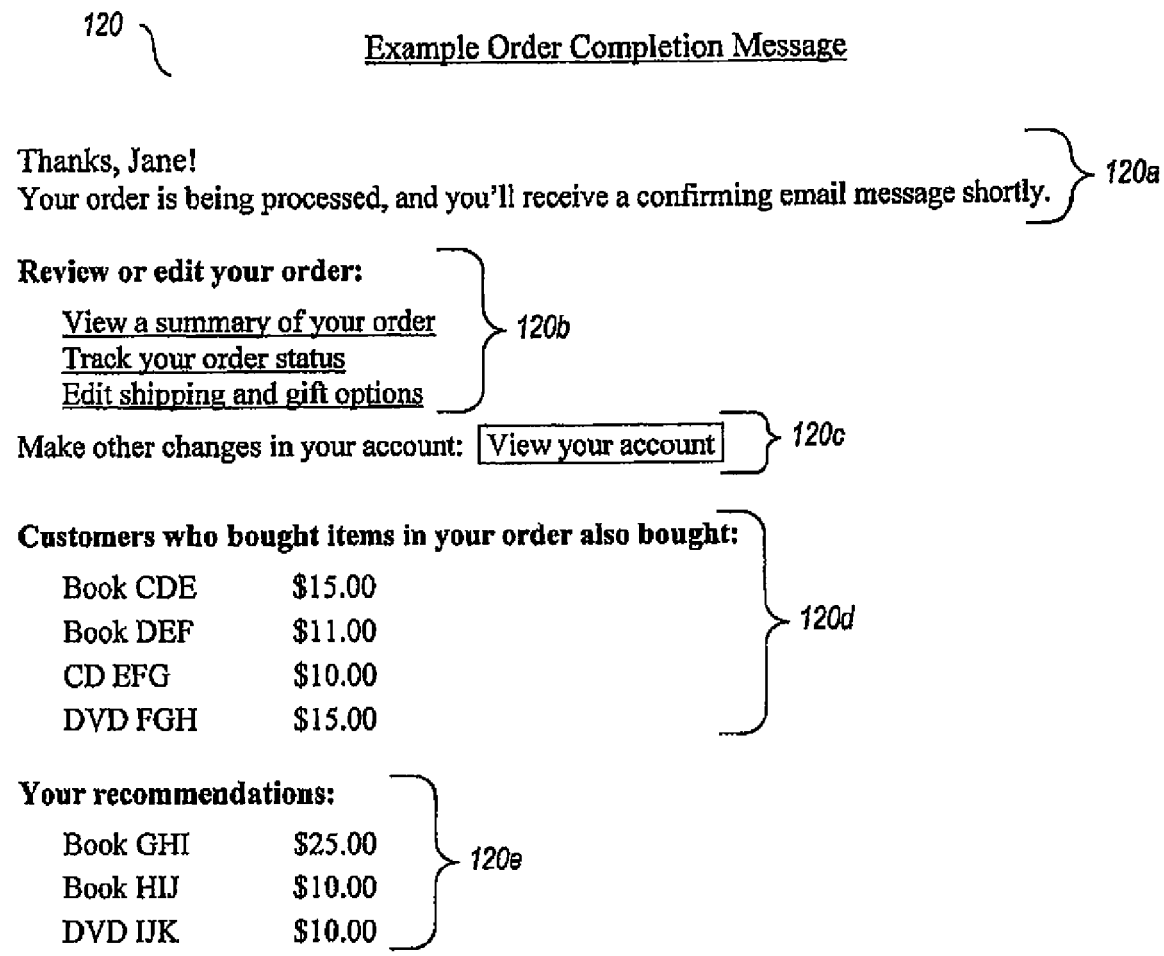

A software facility is described below that assists in automatically identifying and handling erroneous orders, such as orders placed by users that were unintended or otherwise mistakes. For example, in some embodiments the facility tracks orders placed by users, and then automatically identifies when a received order from a user is a duplicate of one or more other orders recently placed by the user, such as based on the two orders including the same items, being sent to the same delivery address, and being ordered using the same ordering method (e.g., via a shopping cart checkout ordering process or via a single-action ordering process). When such a duplicate order is identified, the facility in some embodiments delays fulfillment of that order while automatically querying the user to obtain manual confirmation to continue with the duplicate order fulfillment.

The automatic identification of erroneous orders can be performed in various ways in various embodiments. For example, as noted previously, in some embodiments completed orders that are duplicates of one or more prior orders by the same user are identified as being potentially erroneous orders. In other embodiments, potentially erroneous orders can be identified in other ways, such as based more generally on a degree of similarity between an order and one or more prior orders (e.g., a degree of similarity that is less than identical but that nonetheless exceeds a specified similarity threshold), on an amount of time between an order and a similar or identical prior order, on a type of ordering method used to place an order that is similar or identical to a prior order, etc.

More generally, various aspects, of an order may be considered when determining whether an order is a duplicate of another order or is otherwise sufficiently similar to another order, such as the two orders including identical items, identical numbers of copies of the included items, identical destination shipping addresses for the orders, identical ordering methods (e.g., via a shopping cart checkout process versus another type of checkout process, such as ordering based on a single action), identical payment source information, identical shipping instructions (e.g., standard shipping versus 1-day overnight shipping), identical delivery instructions, identical item processing instructions (e.g., whether to wait for all items in a multi-item order to be available before shipping or to instead ship the items as they become available, whether to perform gift wrapping or other additional processing for items, etc.), identical item supplier information (e.g., such as when multiple suppliers of an item are available via an electronic marketplace) and/or identical characteristics of the items (e.g., new versus used condition). In other embodiments, aspects of orders that are not identical but that nonetheless are similar or overlapping may instead be sufficient to establish sufficient similarity between the orders.

In addition, while automatic erroneous order identification processing may in some embodiments be applied for an order only after a user has completed the ordering process such that the order will typically be fulfilled without further intervention by the user, in other embodiments the techniques may be applied to potential orders whose ordering process has not been completed, whether instead of or in addition to completed orders. Such potential orders can take a variety of forms and typically reflect situations in which a user has expressed some interest in ordering one or more items, such as one or more items that have been placed into a shopping cart or other logical storage container by a user, an order for which a user has initiated but not yet completed the ordering process, one or more items for which the user can complete an order with at most a specified number (e.g., 1) of actions, etc.

In order to facilitate the comparison of an order or a potential order (referred to herein generally as a "current order") to one or more prior orders, the facility in some embodiments maintains a cache or other store of information about prior orders that have been placed for some or all users, such as all orders that have been placed during a prior period of time (e.g., the prior twenty minutes, the prior two weeks, etc.) and/or all orders that match a specified criteria (e.g., that have been ordered using a particular type of ordering method). In some embodiments, this prior order information is updated as appropriate when the status of prior orders changes, such as for orders that are canceled or suspended, or for which some or all ordered items are returned. In addition, in some embodiments the prior order information could further be supplemented with information about orders for which the ordering process has been initiated but has not yet been completed, such as to assist in handling situations in which multiple client systems or sessions may be placing orders on behalf of a single user.

In addition, after a current order is automatically identified as being potentially erroneous, the handling of such orders can occur in various ways in various embodiments. For example, as noted previously, in some embodiments a default may apply for such orders that they will be fulfilled unless the user manually intervenes to reject or cancel the order within a specified period of time, while in other embodiments the default may instead be to not proceed to fulfill such orders without manual confirmation by the user to proceed, even if the user had otherwise previously completed the standard order placement process for the order. Such default actions for current orders can further be overridden in various ways in various embodiments, such as by notifying a user of a potentially erroneous order and automatically querying the user to obtain additional manual response instructions from the user regarding the user's desire for proceeding. In some embodiments, such manual response querying is performed only for orders whose order placement process has been completed by a user, while in other embodiments manual response querying could be performed for potential orders, whether instead of or in addition to manual response querying for completed orders. Alternatively, in some embodiments and situations, a user may merely be warned of a potentially erroneous order without querying the user for a response, such as by providing information to the user to inform them of actions that they can take to change the default action if they so desire. For example, in situations in which a potential order is automatically identified as being potentially erroneous, the user may be warned as part of the normal order completion process in order to allow the user to use that information when deciding whether to finish placing the potential order. In other embodiments, orders identified as being potentially erroneous may instead in at least some situations be automatically canceled or prevented from being placed.

In addition to obtaining responses from users as to how to proceed for a current order, the facility may in some embodiments further gather and use a variety of other types of feedback from a user. For example, users may in some embodiments be queried as to their preferences as to how/whether the facility should in the future identify potentially erroneous orders for them and/or what actions should be taken in the future for them when such potentially erroneous orders are automatically identified. Similarly, a user may in some embodiments be queried as to additional reasons or other information regarding an, action or non-action taken by the user with respect to an automatically identified potentially erroneous order, such as a reason for confirming or rejecting the order. In addition to such explicit user feedback, the facility may in some embodiments also gather feedback implicitly based on the types of actions taken by users for orders, such as canceling previously placed orders, returning some or all items from previously placed and fulfilled orders, failing to complete potential orders after having been notified that the orders are potentially erroneous, etc.

In addition, in some embodiments the automatic identification of potentially erroneous orders and/or the handling of any such orders can be personalized or customized for various users in various ways. For example, as previously noted, in some embodiments users may be able to specify user preferences with respect to such potentially erroneous orders, and if so any such user-specified preferences may be considered or followed when the corresponding situations arise. In addition, in some embodiments prior feedback for this user and/or a group of related users (e.g., other users that share certain similarities with this user, or all users) may be analyzed in order to determine whether and how to modify the handling of potentially erroneous orders for this user and/or all users in the related group. For example, when a potentially erroneous order is manually rejected, or when a previously placed order is canceled or had items returned, similar orders in the future may be determined to be more likely to be potentially erroneous due to that feedback. Similarly, feedback regarding reasons for manually confirming or rejecting potentially erroneous orders may allow better prediction in the future of which orders are potentially erroneous. More generally, the personalization or customization of processing may include a variety of activities in various embodiments, such as considering different types of prior orders when doing automatic identification of potentially erroneous orders for different users, using different criteria for identifying duplicate or otherwise erroneous orders, taking different types of notification actions for potentially erroneous orders that are identified, etc.

As one example of using feedback from users, it may be determined that for at least some users the likelihood of a current order being potentially erroneous varies with a length of time between the current order and a prior duplicate or similar order. In particular, some users may make multiple identical or similar purchases very quickly (e.g., when using an ordering method that allows rapid ordering, such as single-action ordering). If so, the likelihood of a current order for such a user being erroneous may be bi-modal, such as by beginning high for a short period after a prior duplicate order (e.g., the first second), dropping during a short subsequent period of time (e.g., between 1 and 2 seconds), rising as the amount of time between orders increases, and then beginning to drop again after the amount of time passes some threshold. Other types of order aspects may similarly affect the likelihood of a current order being potentially erroneous, and a likelihood function for current orders being potentially erroneous can vary in many ways (e.g., linear, multi-modal, exponential, non-continuous, etc.).

As previously noted, in some embodiments potentially erroneous orders are identified based on being a duplicate or otherwise sufficiently similar to one or more prior orders. More generally, in some embodiments a current order for a user is identified as being potentially erroneous based on a change in a pattern of prior orders for that user and/or other users (e.g., other similar users, all users, etc.), such as if the current order has some similarities to prior orders but is not sufficiently similar with respect to one or more aspects. For example, if a user has previously consistently ordered items of one or more particular types for one or more particular recipients (e.g., toys and games were purchased only for the user's two young nephews), but now has a current order with items of those types for a different recipient (e.g., the user's mother), the current order may be identified as being potentially erroneous based on this change in the pattern (whether due to the selected items or the recipient for the current order being erroneous). As with determining similarity of orders, such order patterns can be based on various aspects of orders in various embodiments, including specific items, numbers of copies of items, types of items, recipients, destination addresses, ordering methods, payment source information, shipping instructions, delivery instructions, item processing instructions, item supplier information and/or various characteristics of the items (e.g., media type for a movie, such as via DVD or VHS, or target platform for software, such as for Macintosh or Microsoft Windows). In addition, in some embodiments a threshold may be used to ensure that a group of prior orders is sufficient to constitute a pattern, such as based on a minimum number of prior orders in the group and/or a minimum percentage of the prior orders in the group matching the pattern. More generally, such identification of order patterns can be performed in various ways in various embodiments, such as automatically based on data mining or other similar techniques.

In addition, in some embodiments the determination of whether a current order for a user is identified as being potentially erroneous is based at least in part on whether one or more items in the order are of a replenishable nature, such as types of items that users may buy periodically or repeatedly (e.g., prescription drugs, light bulbs, copying/printing paper, socks, etc.). For example, if a current order is identified as being a duplicate of or otherwise sufficiently similar to one or more prior orders, but the current order is identified as being a replenishment order, the current order may not be identified as being potentially erroneous. An order can be identified as being a replenishment order in a variety of ways, such as based on the items in the current order being replenishable items, based on the current order corresponding to an expected replenishment schedule for those items or types of items (e.g., a previously defined or automatically learned replenishment schedule for the user), based on the order being automatically generated using a predefined replenishment schedule, etc. Moreover, in some embodiments the manual confirmation techniques described above are further used to assist in identifying replenishable items and/or preferred behavior for such replenishable items for users, such as to query the user as to whether to treat one or more items in a potentially erroneous order as being replenishable items in the future so that later orders for those items are not considered potentially erroneous and/or to query the user as to whether and how to seek manual confirmation for replenishable items. Furthermore, in some embodiments some items or types of items may be designated by default as being replenishable items, with the manual confirmation techniques not used for such items or instead used to query the user as to whether to change such items so that they are not treated as being replenishable (e.g., during or after a first purchase of such an item).

In some embodiments, the techniques for automatically identifying potentially erroneous orders and/or obtaining manual confirmation for such orders are further used in conjunction with groups of related users. For example, if a current order for a first user in a group is sufficiently similar to a prior order for a second user in the group (e.g., by including the same items and the same recipient or destination, such as for a third user or for one of the first or second users), the current order may be identified as potentially erroneous, with the first user warned and/or queried for manual confirmation regarding the current order. Such groups of related users can be identified in a variety of ways in various embodiments, such as a group of users that one or more of the users have manually selected (e.g., as being friends or buddies), a group of users given access to and/or having ordered from a user's wish list or gift registry, a purchase circle of users that are related by one or more of various aspects (e.g., geographical location, organizational affiliation, education level or training, etc.), a group of users having a shared organizational affiliation, a group of users dynamically determined based on actions related to the users (e.g., other users for whom a user has recently or ever purchased items one or more times, other users that have recently or ever purchased items for the user one or more times, etc.), etc.

For illustrative purposes, some embodiments of the software facility are discussed below in which particular techniques are discussed for automatically identifying current orders that are potentially erroneous and for handling such identified orders. However, those skilled in the art will appreciate that the invention is not limited to the details of these example embodiments, and that the techniques described can be used in a wide variety of other situations, including with orders that are placed in ways other than via an electronic marketplace (e.g., telephone orders, in-person orders, etc.).

FIGS. 1A-1G illustrate examples of various techniques related to handling automatically identified erroneous orders. For example, FIG. 1A illustrates an example of various information 110 that may be provided to a user who is a customer of a Web store, such as via a Web page provided to a client computing system of the user for display to the user. In this example, the information is displayed after the user has initiated a checkout process to place an order but has not yet completed the order placement process, such as after the user indicated to order the items present in the user's shopping cart (not shown). In this example, the displayed information includes instructions 110a to the user regarding steps for completing the order process for the indicated potential order, including to select a displayed "Place Your Order" control 110c in order to complete the order placement process.

After the user selects the order placement control 110c, an order would typically be placed and then fulfilled without further intervention by the user, such as is reflected in the example order completion message 120 shown in FIG. 1B, which is displayed to the user following selection of control 110c in this example to inform the user of the placement of the order. The order completion message in this example includes various information, such as information 120a related to order fulfillment, user-selectable controls 120b with which the user can review information about the order, a user-selectable control 120c with which the user can select other account-related functionality that is not specific to the current order that was just placed, and various information 120d and 120e about other items that may be of interest for future orders. A variety of other types of information may be shown in such order completion messages in other embodiments, and such messages may further be provided in various other ways (e.g., as an email, as a phone call, as a hard copy sent through postal mail, etc.).

Returning to the order submission preview information 110 shown in FIG. 1A, the information in this example provides a variety of details related to the current potential order, as well as various options for changing aspects of the order. In particular, in this example the displayed information includes various details regarding the items 110k included in the potential order, which in this example includes two copies of a Book ABC item and one copy of a CD BCD item, with all item copies in this example being new and supplied directly by the Web store (as indicated in this example embodiment by a lack of information regarding any other affiliated third-party item supplier). If so desired, the user can make various changes to the items to be included in the order via user-selectable control 110i before completing the order placement. The displayed information also includes summary information 110b regarding costs of the order, information 110d regarding a payment source to be used for the order and a corresponding billing address 110e for the payment source, information 110f showing a shipping address for the order, and details 110j regarding plan fulfillment of the order if it is placed at the current time and with the currently selected options. User-selectable controls are also provided in this example to allow the user to change such information prior to completing the order placement process. The displayed information further includes various user-selectable options 110g regarding a shipping method to be used for the order, as well as various user-selectable options 110h regarding types of item processing to be used for the items in the order.

FIG. 1C illustrates one example of using disclosed techniques to automatically identify and handle potentially erroneous current orders. In particular, in this example a potentially erroneous order placement confirmation query message 130 has been displayed to the user after the user selects the order placement completion control 110c of FIG. 1A. In particular, in this example the order illustrated in FIG. 1A has been identified as being potentially erroneous, and in particular in this case being a duplicate of an order placed by the user only a few minutes ago. Thus, rather than displaying an order completion message such as that shown in FIG. 1B and proceeding to fulfill the order without additional user intervention, the user is instead provided with information 130a that notifies them of the possibility of the current order having been erroneously placed, along with user-selectable controls 130b and 130c for the user to respond by confirming or rejecting the placement of the order, respectively. In this example, the message 130 further includes information 130d regarding the current order for reference purposes, although some or all such order details may not be shown in other embodiments (e.g., by showing only the items ordered without other information).

If the user selects the order placement confirmation control 130b, the user will in this example then receive an order completion message as illustrated in FIG. 1B, and the order fulfillment process will then continue without further intervention on the part of the user. Alternatively, if the user instead selects the order placement rejection control 130c, the current order will not be placed. In some embodiments, if the user does not select either of the controls 130b or 130c, or does not select one of the controls within a predetermined period of time, a default action regarding the order may be taken, such as to proceed to fulfill the current order in some embodiments or to cancel the current order in other embodiments. Alternatively, in other embodiments the user may be required to manually indicate their desire regarding whether to proceed with fulfillment of the current order before being allowed to otherwise proceed, or instead the current order may remain on hold (e.g., by returning the items to the shopping cart of the user, or instead by marking the order for special treatment) until the user manually indicates their desire for proceeding with the current order.

FIG. 1D illustrates an alternative example potentially erroneous order placement confirmation query message 140 that may be provided to the user after the user indicates to place the order using control 110c of FIG. 1A. In particular, in this example the warning information 140a indicates not only that a similar order was previously placed several days earlier, but the message includes details in the warning and in other displayed information 140f regarding the prior order. In this example, the payment source information, shipping address, and shipping method remain the same between the two orders; but the item contents of the orders are not identical and the item processing instructions also differ. In particular, in the prior order only a single copy of the Book ABC item was ordered, and an additional item CD EFG was also included. As previously noted, in some embodiments only certain subsets of order-related information may be considered when determining whether orders are duplicates or sufficiently similar, such as to ignore payment source information and/or item processing instructions.

As in the example shown in FIG. 1C, the user is queried to manually provide their response instructions for proceeding by selecting one of the controls 140b-140d, although in this example the user is provided an additional option to proceed with the current order in lieu of the prior order. Such an option may not be available in all embodiments or situations, such as when the prior order has already reached a particular stage of fulfillment processing (e.g., has been shipped from a distribution center of the Web store). In addition, in this example, the user is further provided with a user-selectable option 140e that allows the user to request or specify a preference regarding whether to provide such order confirmation query messages to the user in the future. In some embodiments, declining to receive such user confirmation query messages may be allowed only in certain circumstances, such as if the user is willing to accept additional processing or other costs in the future if the user does place erroneous orders and then later cancels the orders or returns the items in the orders.

FIG. 1E illustrates yet another alternative example potentially erroneous order confirmation query message 150. In this example, the message 150 is similar to message 130 of FIG. 1C, but includes additional sections 150e-150g to allow additional feedback from the user beyond the mere selection of one of the controls 150b or 150c. In particular, in this example the user can select one or more options 150g to allow the user to specify various preferences regarding how to handle the automatic identification of potentially erroneous orders in the future for this user and/or any notifications regarding such orders for this user. As is illustrated, the user may be allowed to indicate such preferences at a variety of levels of specificity in various embodiments. This example message 150 further allows the user to select one or more of various reasons 150e to explain why they are choosing to confirm or reject the placement of the duplicate order, and can also provide additional textual comments 150f as desired. As previously noted, in some embodiments such feedback from the user may be analyzed (e.g., using various automated techniques) in order to improve future automatic identification of potentially erroneous orders and/or future handling of such orders, whether in a manner specific to this user or for other users as well (e.g., for all users of the Web store).

FIG. 1F illustrates an example of providing a warning notification to a user regarding a potentially erroneous current order, but without querying the user to provide additional manual response instructions specific to confirming or rejecting placement of the current order. In particular, in this example a pre-order placement completion preview message 160 is illustrated in a manner similar to that previously discussed with respect to message 110 of FIG. 1A, but in which an additional warning notification 160 is included to notify the user that a duplicate order for these items was recently placed. In this example, the warning notification includes an indication that a different shipping method was used for the prior order than is currently selected, although in other embodiments such warning notifications could lack any specific information regarding the prior order or could instead include a variety of additional information about the prior order (e.g., date and time, order ID, current status of the prior order, etc.). As was previously discussed with respect to FIG. 1A, if the user desires to complete the ordering process for the current order, the user will select the user-selectable order placement confirmation control 160c. In this example, such selection would take the user to an order completion message such as that shown in FIG. 1B Without including an intervening potentially erroneous order confirmation query message, although in other embodiments a message such as that shown in FIG. 1C could instead be used in addition to one or more Warning notification messages previously provided to the user. Such warning notification messages can in some embodiments be provided to users in a variety of situations in which the user has expressed an indication of possibly placing an order for one or more items (e.g., as part of a shopping cart display, on a page providing detailed information related to a specific item, etc.).

FIG. 1G illustrates an alternative use of a warning notification message 170w. In particular, in this example the warning notification is provided as part of an order completion message 170 that is displayed to the user after the user has indicated to place the current order in a manner similar to that shown in FIG. 1B. In the illustrated embodiment, if the user takes no further interaction with respect to the current order, if will continue to be fulfilled in the normal manner. However, the illustrated warning notification message in this example provides instructions to the user regarding additional manual intervention that the user can take to cancel the current order if they so desire, such as to select a displayed user-selectable control 170f. Such an order completion message with a warning notification may be provided to a user in various situations in various embodiments, such as when the warning notification is the first indication to the user of the current order being potentially erroneous, after having provided one or more prior warnings to the user similar to that illustrated with respect to FIG. 1F, and/or after having provided a potentially erroneous order confirmation query message to the user such as that shown in FIG. 1C.

Figure 2:
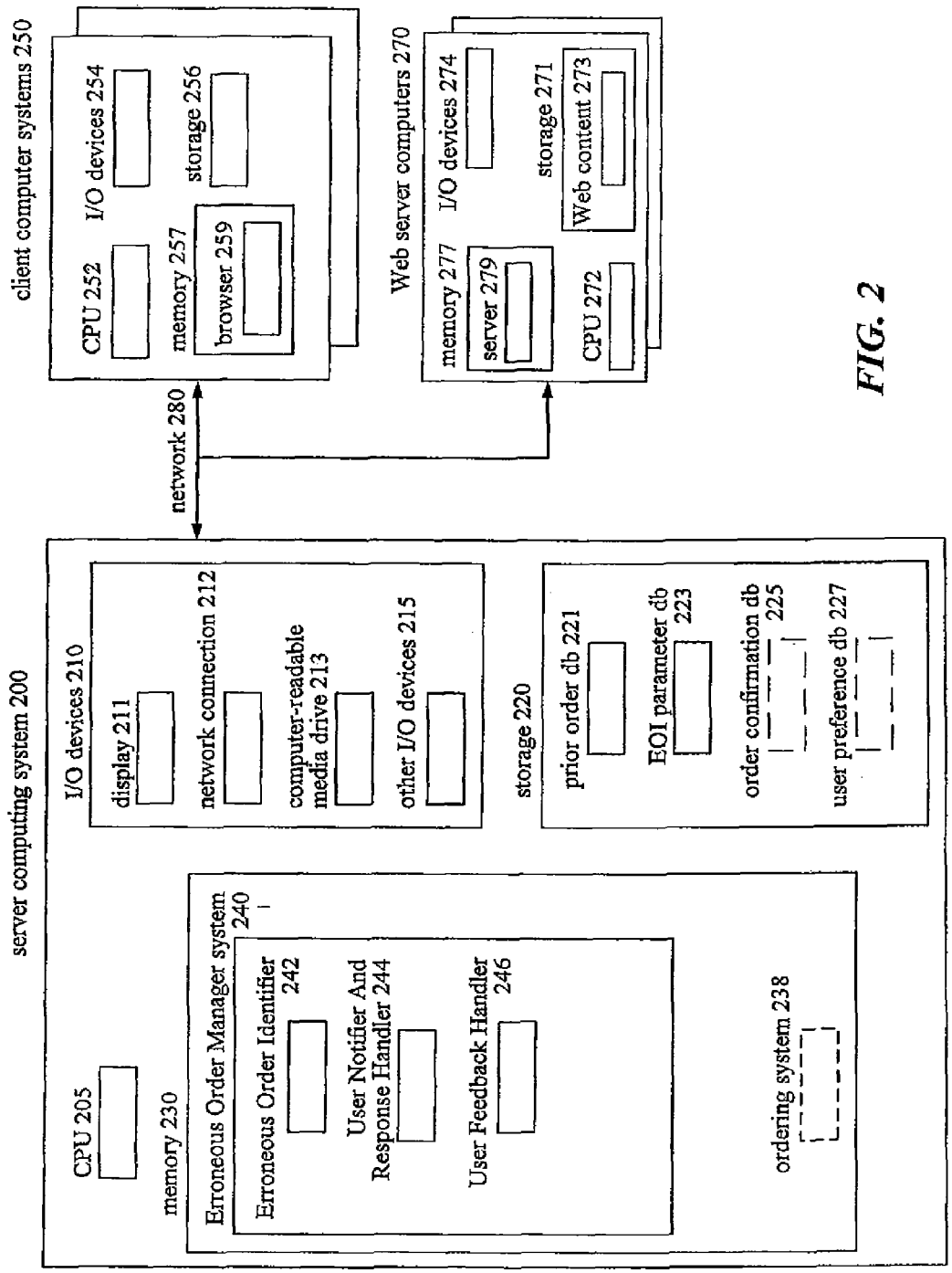
FIG. 2 is a block diagram illustrating an embodiment of a system for automatically identifying and handling potentially erroneous orders.

FIG. 2 illustrates a server computing system 200 suitable for executing an embodiment of an Erroneous Order Manager system facility, as well as various client computer systems 250 and Web server computers 270. The server computing system 200 includes a CPU 205, various I/O devices 210, storage 220, and memory 230. The example I/O devices include a display 211, a network connection 212, a computer-readable media drive 213, and various other I/O devices 215. An embodiment of the Erroneous Order Manager system 240 is executing in memory 230, and in the illustrated embodiment it includes an Erroneous Order Identifier component 242, a User Notifier And Response Handler component 244, and a User Feedback Handler component 246.

In the illustrated embodiment, an optional ordering system 238 with which the Erroneous Order Manager system interacts is also executing in memory 230, although in other embodiments other configurations are possible, such as having one or more ordering systems instead executing remotely (e.g., on one of the Web servers 270) and interacting with the system 240, having some or all of the system 240 components and/or functionality integrated with an ordering system, having the system 240 operate independently of any specific ordering system (e.g., by processing orders placed by users after an ordering system provides them to an order fulfillment system), etc. In addition, while not illustrated here, the ordering system may include a variety of information to assist its operation, such as information about items available to be ordered, about users who are customers (e.g., preferences, payment information, shipping addresses, etc.), information about orders that have been placed and current status of fulfillment of those orders, etc.

In the illustrated embodiment, users of various client computer systems interact with the ordering system in order to place orders for items, such as by using Web browsers 259 executing in memory 257 of the client computer systems. When the ordering system desires to have processing performed to determine whether a current order is potentially an erroneous order (e.g., for all completed orders after the order placement process has been completed by the users), the ordering system provides information about the current order to the system 240. The Erroneous Order Manager system then provides information about the current order to the Erroneous Order Identifier component, which proceeds to determine whether the current order is potentially erroneous, such as by comparing information about the current order to information about prior orders by the user from a prior order database 221 on storage 220. In addition, in the illustrated embodiment various information about how to perform the determination of whether a current order is potentially erroneous is stored in an Erroneous Order Identifier parameter database 223 on storage 220, and is retrieved and used by the Erroneous Order Identifier component as part of its processing. In some embodiments, the information in the parameter database 223 may be specific to the particular user and/or to a subset of all users to which the user belongs, while in other embodiments may be consistent for all users. Similarly, in the illustrated embodiment the component 242 may also retrieve and use any preference information for the user from an optional user preference database 227 on storage.

When the Erroneous Order Identifier component determines that the current order is potentially erroneous, information about the current order and optionally one or more related prior orders is provided to the User Notifier And Response Handler component for processing. The component 244 then determines an appropriate manner of notifying the user of the potentially erroneous current order. In the illustrated embodiment, the component 244 may in some situations (e.g., when the current order has already been placed by the user) interact directly with the user to provide information about the current order being potentially erroneous and to query the user for confirmation or rejection of further fulfillment processing for the current order, such as by providing an appropriate Web page to the user for display. After the component 244 receives a response from the user regarding confirming or rejecting the current order; the component 244 takes appropriate action to effect the user's indicated intention, such as by interacting with the ordering system. In addition, in the illustrated embodiment the component 244 further stores information related to any such confirmation or rejection responses in an optional order confirmation database 225 on storage 220, such as to allow for later analysis and possible modification of Erroneous Order Identifier processing parameters based on the information.

In other situations, the component 244 may instead determine to warn the user regarding the potentially erroneous order but to not affirmatively query the user for confirmation or rejection. If so, in some embodiments the component 244 may interact directly with the user to provide the warning information, while in other embodiments may provide the warning information and/or an indication that a warning should be provided to the ordering system so that the ordering system can provide an appropriate warning to the user (e.g., by incorporating the warning into other order-related information to be provided to the user). Similarly, in other embodiments the component 244 may instead not itself perform interactions with the user to obtain confirmation or rejection responses for potentially erroneous orders, but could instead interact with the ordering system so that the ordering system provides that functionality. As with the Erroneous Order Identifier component, the component 244 may also retrieve and use information from the EOI parameter database and/or the user preference database to affect the processing that is performed.

When feedback is received from users related to potentially erroneous orders, such as by the component 244 (e.g., confirmation or rejection responses and/or other feedback) or from other sources (e.g., notifications from the ordering system of cancelled orders), the information is provided to the User Feedback Handler component 246 for processing in the illustrated embodiment, although in other embodiments such feedback handling may not be performed. The component 246 then stores user preference information that is received in the user preference database if not already present, and stores other feedback information in the order confirmation database or other user feedback database (not shown) if not already present. The component 246 then proceeds to analyze the feedback information in order to determine whether to modify the processing of potentially erroneous orders (e.g., by modifying parameter values in the EOI parameter database), whether in a manner specific to the current user, for groups of related users, or for all users.

The functionality of the system 240 can be accessed in various ways in various embodiments. As indicated above, in some embodiments the system 240 interacts with one or more ordering systems, such as in an automated programmatic manner. In other embodiments, users may interact directly with the system 240 for various purposes, such as for customers to specify user preferences and provide feedback (e.g., confirmation and rejection responses) or for administrative users to monitor performance of the system. As noted, some users may interact with the system 240 via remote client computing devices, while in other embodiments some users may have physical access to the server computing system 200, and if so can interact with the various I/O devices 210 to provide and/or receive information. Information provided to users of client computer systems can be presented to those users on appropriate I/O devices 254 of those systems, and various information related to user preferences and order information can be stored in storage 256 or memory 257 of such client devices. The client computer systems and/or server computing system 200 may also interact with one or more other computer systems, such as the Web server computers, for various other purposes.

Those skilled in the art will appreciate that computing systems and devices 200, 250 and 270 are merely illustrative and are not intended to limit the scope of the present invention. Computing system 200 may be connected to other devices that are not illustrated, including through one or more networks such as the Internet or via the Web. More generally, a "client" or "server" may comprise any combination of hardware or software that can interact in the indicated manners, including computers, network devices, internet appliances, PDAs, wireless phones, pagers, electronic organizers, television-based systems and various other consumer products that include inter-communication capabilities. In addition, the functionality provided by the illustrated system 240 components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing device via inter-computer communication. Some or all of the system 240 components or data structures may also be stored (e.g., as instructions or structured data) on a computer-readable medium, such as a hard disk, a memory, a network, or a portable article to be read by an appropriate drive. The system 240 components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

Figure 3:
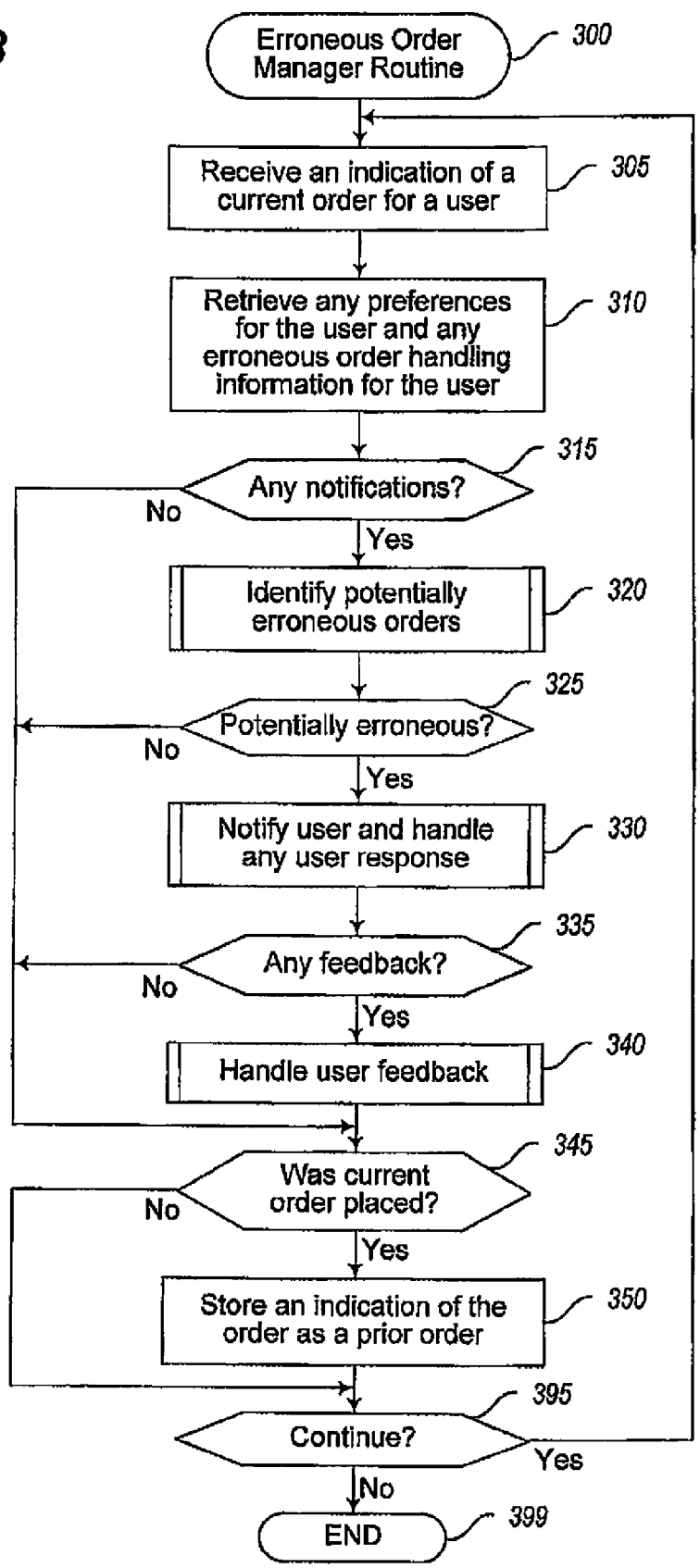
FIG. 3 is a flow diagram of an embodiment of an Erroneous Order Manager routine.

FIG. 3 is a flow diagram of an embodiment of an Erroneous Order Manager routine 300. In the illustrated embodiment, the routine operates independently of one or more ordering systems but interacts with such ordering systems in order to provide appropriate functionality to end-users, although in other embodiments some or all of the functionality of the routine could instead be embodied directly in an ordering system. In addition, in the illustrated embodiment the routine may analyze both potential orders and completed orders, although in other embodiments only completed orders may be analyzed. Similarly, while the routine in the illustrated embodiment both queries users for manual responses and provides non-query warnings in various situations, in other embodiments only one such functionality may be used.

The routine begins at step 305; where an indication of a current order for a user is received. The routine continues to step 310 to retrieve information to be used for the processing of the current order to determine whether it is potentially erroneous, including appropriate erroneous order handling parameters and any related user preferences. In some embodiments, such information may be specific to the user and/or to a group of users to which the user belongs, while in other embodiments the information may be applied consistently to all users. The routine then continues to step 315 to determine whether any notifications are to be provided for this user, such as based on user preferences or an automated determination. If so, the routine continues to execute subroutine 320 to identify whether the current order is a potentially erroneous order. The routine then continues to step 325 to determine whether the current order was identified as being potentially erroneous. If so, the routine continues to execute subroutine 330 to notify the user and handle any user response as appropriate. The routine then continues to step 335 to determine whether any feedback was received from the User, and if so continues to execute subroutine 340 to handle the user feedback as appropriate. After step 340, or if it was instead determined in step 315 that no notifications were to be performed, or in step 325 that the current order was not potentially erroneous, or in step 335 that no feedback from the user was received, the routine continues to step 345 to determine whether the current order is one for which the user has completed the order placement process. If so, the routine continues to step 350 to store information about the order as a prior order for later use in identifying potentially erroneous orders. After step 350, or if it was instead determined in step 345 that the current order was not one for which the order placement process was completed, the routine continues to step 395 to determine whether to continue. If so, the routine returns to step 305, if not the routine continues to step 399 and ends.

Figure 4:
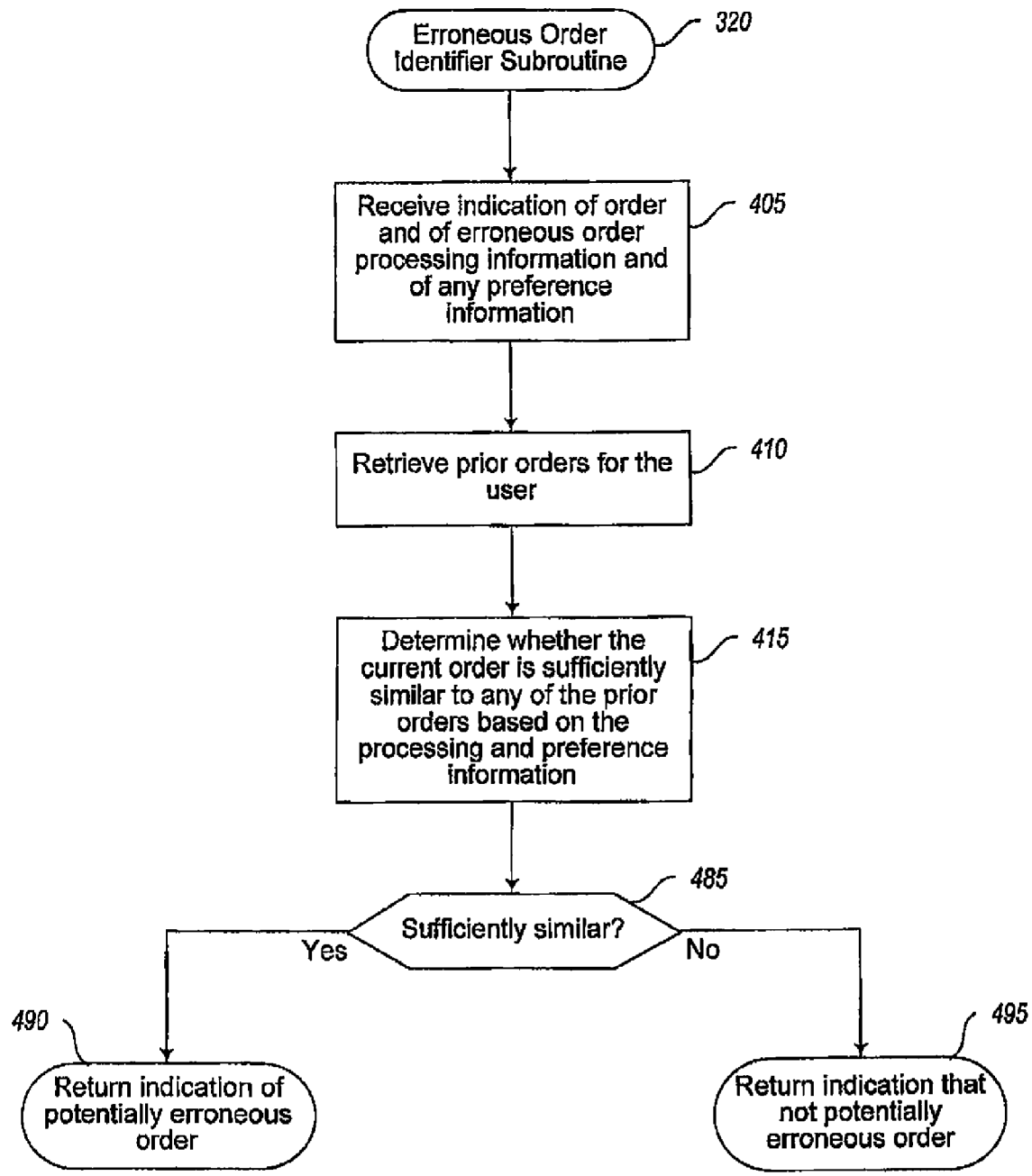
FIG. 4 is a flow diagram of an embodiment of an Erroneous Order Identifier subroutine.

FIG. 4 is a flow diagram of an embodiment of an Erroneous Order Identifier subroutine 320. In the illustrated embodiment, the subroutine determines whether a current order is potentially erroneous based on its similarity to prior orders by the user, such as to determine whether the current order is a duplicate of a prior order. In other embodiments, other types of processing could be used to identify potentially erroneous orders, whether in addition to or instead of processing based on similarity to prior orders by the user.

In the illustrated embodiment, the subroutine begins in step 405, where an indication is received of the current order and of erroneous order processing parameter information and any preference information for the user. The subroutine continues to step 410 to retrieve information about prior orders for the user. In some embodiments, the orders retrieved will be limited to a subset of prior orders for the user, such as on a user-specific basis (e.g., all prior orders of the user within a specified prior period of time, prior orders that satisfy certain specified criteria such as a type of ordering method, etc.). After step 410, the subroutine continues to step 415 to determine whether the current order is sufficiently similar to any of the prior orders based on the processing and preference information from step 405. In some embodiments, the similarity determination may be based on whether the current order is a duplicate of a prior order when considering one or more specified aspects of the order, while in other embodiments other types of similarity analyses may be performed. In addition, in some embodiments the similarity analysis will be performed in a manner specific to the current user, while in other embodiments may be performed in a consistent manner for all users or for groups of users. After step 415, the subroutine continues to step 485 to determine whether the current order was found to be sufficiently similar to be potentially erroneous. If so, the subroutine continues to step 490 to return an indication that the current order is potentially erroneous, and if not the subroutine continues to step 495 to return an indication that the current order is not potentially erroneous.

Figure 5:
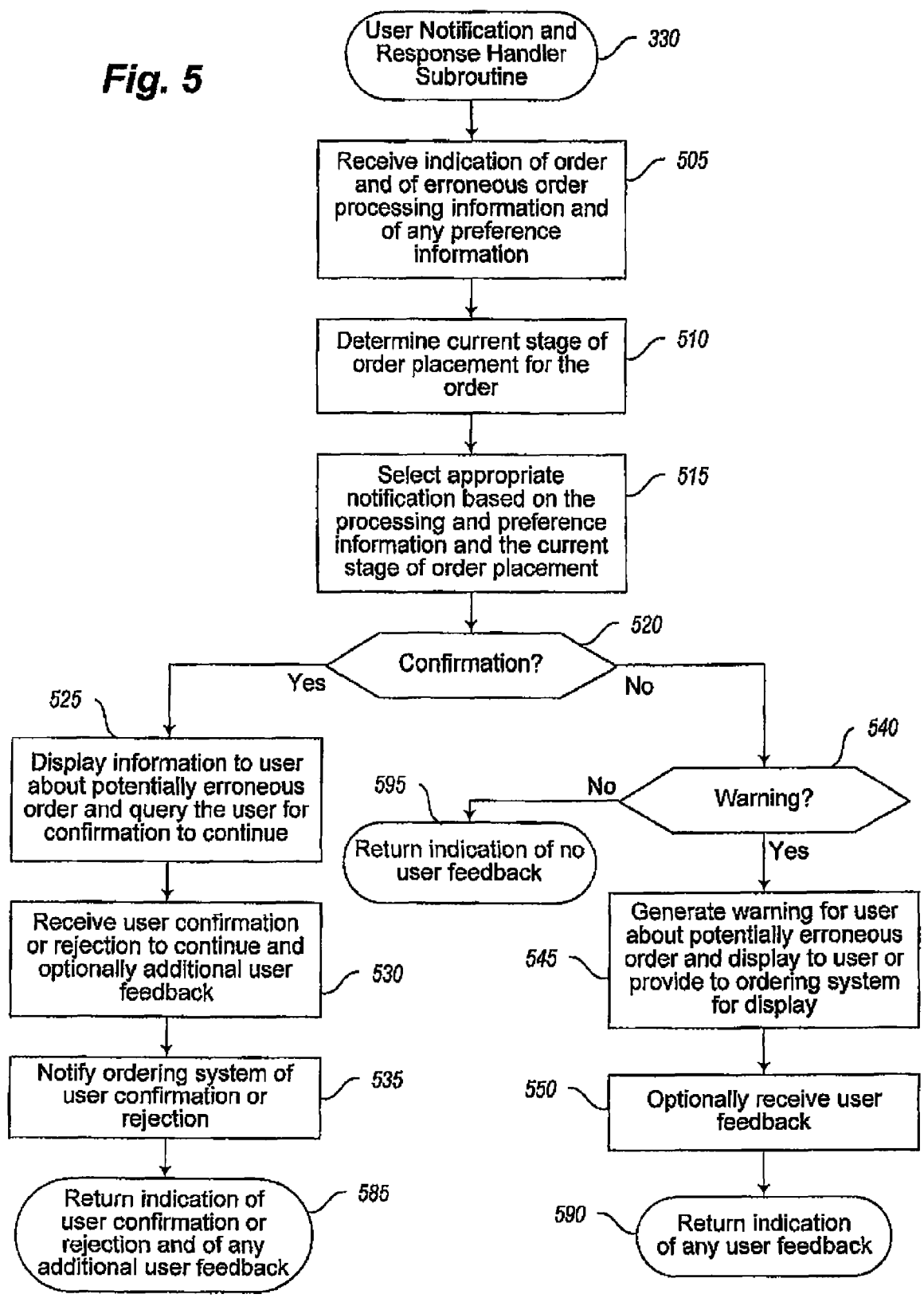
FIG. 5 is a flow diagram of an embodiment of a User Notification And Response Handler subroutine.

FIG. 5 is a flow diagram of an embodiment of a User Notification And Response Handler subroutine 330. In the illustrated embodiment, the subroutine determines an appropriate manner to notify a user of a potentially erroneous order, including in some situations querying the user for a confirmation or rejection response. In the illustrated embodiment, the subroutine interacts directly with a user to query the user for such responses but interacts with an external ordering system in order to provide warning information to the users, although in other embodiments such warnings and/or response queries could instead be performed in other manners.

In the illustrated embodiment, the subroutine begins in step 505, where an indication is received of the current order and of erroneous order processing parameter information and any other preference information for the user. In some embodiments, the received indication may further include details about the identification of the current order as being potentially erroneous, such as information about one or more prior orders to which the current order relates and/or other reasons why the current order is identified as potentially erroneous. The subroutine continues to step 510 to determine the current stage of order placement processing for the order, such as to determine whether the current order has already been placed by the user. In step 515, the subroutine then selects an appropriate notification type based on the current stage of order placement as well as on the processing parameters and preference information.

In step 520, the subroutine determines whether the appropriate notification is to query the user for a confirmation or rejection response, and if so continues to step 525 to display information to the user about the potentially erroneous order and to query the user for confirmation or rejection of the current order. After step 525, the subroutine in step 530 receives an indication from the user of user confirmation or rejection and optionally receives additional user feedback, such as based on feedback questions provided to the user in step 525. The subroutine then continues to step 535 to notify the ordering system of the user confirmation or rejection, although in other embodiments could instead act directly to effect the user's desires as indicated, such as to cancel orders that have been placed after a rejection is received or to cause order processing to continue after a confirmation is received in embodiments in which the order fulfillment will be suspended until such confirmation is received.

If it was instead determined in step 520 that the appropriate notification was not to query the user for a confirmation or rejection response, the subroutine continues instead to step 540 to determine whether the user should be warned without querying for a response. If not, the subroutine continues to step 595 to return, and provides an indication that no user feedback was received. If it is Instead determined in step 540 that a warning is appropriate, the subroutine continues to step 545 to generate an appropriate warning for the user about the current order being potentially erroneous and then provides the warning to the ordering system for display to the user, such as in situations in which the order has not yet been placed and the warning is to be provided as part of the order placement confirmation process for the user. In other embodiments or situations, the subroutine could instead display the warning information to the user directly. After step 545, the subroutine continues to step 550 to optionally receive user feedback (e.g., feedback queried from the user in step 545), whether directly from the user by the subroutine or instead based on information provided back to the subroutine from the ordering system (e.g., after a warning display by the ordering system). After step 550, the subroutine continues to step 590 to return with an indication of any user feedback that was received. Similarly, after step 535, the subroutine continues to step 585 to return an indication of any confirmation or rejection response from the user as well as of any additional user feedback received.

Figure 6:
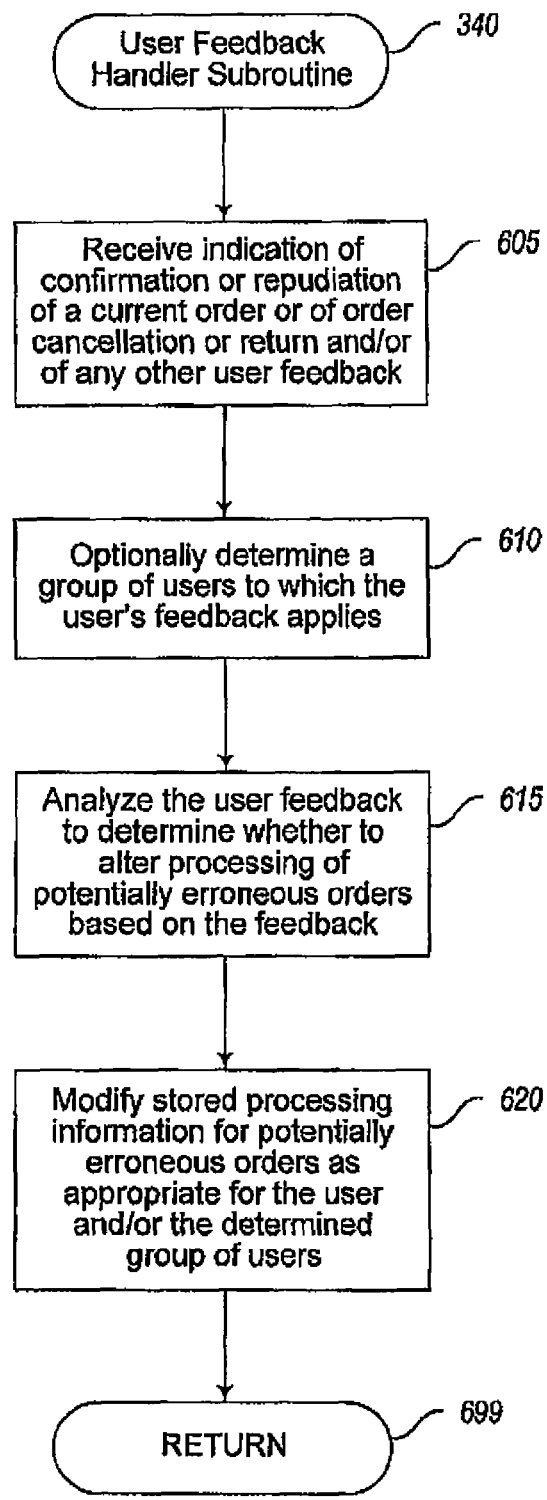
FIG. 6 is a flow diagram of an embodiment of a User Feedback Handler subroutine.

FIG. 6 is a flow diagram of an embodiment of a User Feedback Handler subroutine 340. In the illustrated embodiment, the routine processes various feedback from the user in order to improve the processing for potentially erroneous orders over time, whether in a manner specific to individual users or instead for groups of related users or all users. In other embodiments, such feedback handling may not be performed, or may instead be performed in other manners.

In the illustrated embodiment, the subroutine begins in step 605, where an indication is received of user feedback related to an order or more generally to user preferences related to the handling of potentially erroneous orders. In step 610, the subroutine optionally determines one or more groups of users to which the users feedback will apply, such as in embodiments in which group-specific order processing is used. After step 610, the subroutine continues to step 615 to analyze the user feedback to determine whether to alter processing of potentially erroneous orders for the user and/or other users (e.g., the determined groups of users) based on the feedback. In some embodiments, the feedback is analyzed in conjunction with feedback related to prior orders, such as to compare user confirmation and rejection responses or other feedback for various orders to enable detection of patterns. Thus, if this user and/or groups of users consistently confirm or reject orders that have been identified as potentially erroneous in certain situations or when the orders share certain attributes, the potentially erroneous order processing parameters may be adjusted to eliminate the need for user responses in such situations (e.g., by causing such orders to not be identified as potentially erroneous if users consistently confirm them), by changing thresholds used to determine whether orders are sufficiently similar, by changing types of order information used to determine whether orders are sufficiently similar, by changing the type of notification in certain situations (e.g., to warn users rather than affirmatively query them for responses in situations in which the users consistently confirm orders that were identified as potentially erroneous), etc. After step 615, the subroutine continues to step 620 to modify stored processing information and/or user preferences for the user and/or the determined groups of users as appropriate based on the analysis in step 615. After step 620, the subroutine continues to step 699 and returns.

Those skilled in the art will also appreciate that in some embodiments the functionality provided by the routines and subroutines discussed above may be provided in alternative ways, such as being split among more routines or consolidated into less routines. Similarly, in some embodiments illustrated routines and subroutines may provide more or less functionality than is described, such as when other illustrated routines or subroutines instead lack or include such functionality respectively, or when the amount of functionality that is provided is altered. In addition, while various operations may be illustrated as being performed in a particular manner (e.g., in serial or in parallel, or synchronously or asynchronously) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for identifying erroneous duplicate orders, the method comprising:
   receiving an indication of a current order placed by a user;
   automatically determining whether the current order is a duplicate with one or more prior orders that were previously placed by the user, the automatic determining being performed by one or more configured computing systems in a manner that is personalized to the user, wherein the manner personalized to the user differs from one or more other manners for automatically determining if other orders placed by other users are duplicates;
   when it is determined that the current order is not a duplicate, automatically proceeding to fulfill the current order without further intervention by the user, the automatic proceeding being performed by the one or more configured computing systems; and
   when it is determined that the current order is a duplicate, querying the user to obtain manual confirmation before proceeding to fulfill the current order.

2. The method of claim 1 wherein the one or more prior orders are orders that were previously placed within a specified prior period of time.

3. The method of claim 1 wherein the one or more prior orders are orders previously placed by the user that satisfy one or more specified criteria.

4. The method of claim 1 including, when a manual response from the user confirms the current order, proceeding to fulfill the current order without further user intervention.

5. The method of claim 1 including, when a manual response from the user rejects the current order, canceling the current order.

6. The method of claim 1 including analyzing manual feedback from one or more users regarding one or more orders placed by those users in order to identify aspects of the orders that assist in predicting whether future orders are potentially erroneous, and wherein future automatic determining of whether an order is a duplicate is based on comparing aspects of the order to the identified order aspects.

7. The method of claim 1 wherein the automatic determining of whether the current order is a duplicate with one or more prior orders includes comparing types of information in the current and prior orders that are selected in a manner specific to the user.

8. The method of claim 1 wherein the automatic determining of whether the current order is a duplicate with one or more prior orders includes selecting the prior orders in a manner specific to the user.

9. The method of claim 1 wherein orders may be placed by users using multiple distinct types of ordering processes, and wherein the automatic determining of whether the current order is a duplicate with one or more prior orders includes comparing the types of ordering processes used to place the current and prior orders.

10. The method of claim 1 wherein the automatic determining of whether the current order is a duplicate with one or more prior orders in a manner specific to the user is based at least in part on analyzing prior behavior of the user.

11. The method of claim 1 wherein the automatic determining of whether the current order is a duplicate with one or more prior orders in a manner specific to the user is based at least in part on one or more preferences previously indicated by the user.

12. The method of claim 1 wherein the method is performed for each of multiple current orders received from multiple users, and wherein a second current order that is identical to the current order but is placed by a second user is not determined to be a duplicate.

13. The method of claim 1 wherein the automatic determining of whether the current order is a duplicate with one or more prior orders is performed in a manner specific to a group of multiple related users that includes the user and that is automatically identified based on behavior of those users.

14. The method of claim 1 wherein the automatic determining of whether the current order is a duplicate with one or more prior orders is performed in a manner specific to a group of multiple related users that includes the user and that is automatically identified based on characteristics of those users.

15. The method of claim 1 wherein the querying of the user to obtain manual confirmation is performed automatically by the one or more configured computing systems in a manner specific to the user.

16. The method of claim 1 including maintaining information about orders that were placed within a specified prior period of time, and wherein the prior orders are at least some of the orders whose information is maintained.

17. The method of claim 16 wherein the maintaining is performed repeatedly such that the orders whose information is maintained are orders placed within a specified prior period of time relative to a current time.

18. The method of claim 16 including updating the maintained information to reflect changes to orders by customers after those orders were placed.

19. The method of claim 1 wherein the determining of whether the current order is a duplicate with one or more prior orders includes comparing a subset of information included as part of each of the orders.

20. The method of claim 1 wherein the determining of whether the current order is a duplicate with one or more prior orders includes comparing a manner of placing the orders.

21. The method of claim 1 wherein the determining of whether the current order is a duplicate with one or more prior orders includes determining whether a degree of similarity between the current order and one or more of the prior orders exceeds a specified threshold.

22. The method of claim 1 wherein the determining of whether the current order is a duplicate with one or more prior orders is part of determining whether the current order is potentially erroneous, and including querying the user to obtain manual confirmation before proceeding to fulfill the current order any time that it is determined that the current order is potentially erroneous.

23. The method of claim 1 including automatically determining whether another current order that has not yet been placed by a user is a duplicate with one or more prior orders that were previously placed by that user and, when it is determined that the another current order is a duplicate, warning the user that the another current order is a duplicate.

24. The method of claim 1 wherein the automatic determining in the manner personalized to the user of whether the current order is a duplicate is based at least in part on feedback obtained from the user related to one or more prior orders.

25. The method of claim 1 wherein the automatic determining of whether the current order is a duplicate in the manner personalized to the user is based at least in part on one or more prior interactions with the user.

26. The method of claim 25 wherein the one or more prior interactions with the user with which the automatic determining of whether the current order is a duplicate is personalized to the user include obtaining responses by the user to prior querying for confirmations to proceed with prior orders by the user that were automatically determined to be duplicates.

27. The method of claim 25 wherein the one or more prior interactions with the user with which the automatic determining of whether the current order is a duplicate is personalized to the user include obtaining preferences specified by the user regarding how to perform future automatic determining of whether an order of the user is a duplicate.

28. The method of claim 1 further comprising, before the automatic determining in the manner personalized to the user of whether the current order is a duplicate, automatically identifying the personalized manner for the user based at least in part on modifying a default manner of determining whether a current order for a user is a duplicate.

29. The method of claim 1 wherein the automatic determining in the manner personalized to the user of whether the current order is a duplicate includes determining that the current order is a duplicate, and wherein the method further comprises:
    receiving an indication of a second current order placed by a distinct second user; and
    automatically determining whether the second current order is a duplicate with one or more prior orders that were previously placed by the second user, the automatic determining for the second current order being performed in a manner that is distinct from the manner personalized to the user such that the second current order is not determined to be a duplicate, the second current order being substantially identical to the current order, and the one or more prior orders that were previously placed by the second user being substantially identical to the one or more prior orders that were previously placed by the user.

30. The method of claim 1 wherein the automatic determining in the manner personalized to the user of whether the current order is a duplicate includes determining that the current order is not a duplicate, and wherein the method further comprises:
    receiving an indication of a second current order placed by a distinct second user; and
    automatically determining whether the second current order is a duplicate with one or more prior orders that were previously placed by the second user, the automatic determining for the second current order being performed in a manner that is distinct from the manner personalized to the user such that the second current order is determined to be a duplicate, the second current order being substantially identical to the current order, and the one or more prior orders that were previously placed by the second user being substantially identical to the one or more prior orders that were previously placed by the user.

31. A computing device for identifying potentially erroneous orders, comprising:
  one or more processors;
  an erroneous order identifier component that is configured to, when executed by at least one of the one or more processors, determine whether orders placed by users are potentially erroneous based at least in part on actions previously taken by the users regarding other orders, the determining being performed for each of at least some of the users in a manner that is personalized to that user based at least in part on prior interactions with that user so as to differ from one or more manners used for other users for determining if other orders placed by those other users are potentially erroneous; and
  a user notifier component that is configured to, when executed by at least one of the one of more processors, and when it is determined that an order placed by a user is potentially erroneous, notify the user of the determining for the order so that the user can provide a response regarding an action to take for the order.

32. The computing device of claim 31 wherein the determining of whether an order for a user is potentially erroneous includes determining that the order is potentially erroneous if the order is a duplicate of a prior order that the user previously placed.

33. The computing device of claim 31 wherein the determining of whether an order for a user is potentially erroneous includes determining that the order is potentially erroneous if it is sufficiently likely that the user did not intend to place the order.

34. The computing device of claim 31 wherein the determining of whether an order for a user is potentially erroneous includes determining that the order is potentially erroneous if it is sufficiently likely that placing of the order by the user was a mistake.

35. The computing device of claim 31 wherein the notifying of a user of the determining for an order includes querying the user and obtaining a manual confirmation response from the user to fulfill the order.

36. The computing device of claim 31 further comprising a user feedback handler component that is configured to analyze feedback from one or more users regarding one or more orders for those users in order to identify aspects of the orders that assist in predicting whether future orders are potentially erroneous.

37. The computing device of claim 31 wherein the erroneous order identifier component and the user notifier component each includes software instructions for execution by the computing device.

38. The computing device of claim 31 wherein the erroneous order identifier component consists of a means for determining whether orders for users are potentially erroneous based at least in part on actions previously taken by the users regarding other orders, and wherein the user notifier component consists of a means for notifying the user of the determining for the order so that the user can provide a response regarding an action to take for the order after it is determined that an order for a user is potentially erroneous.

39. A non-transitory computer-readable medium whose contents configure a computing system to identify potentially erroneous orders, by performing a method comprising:
  automatically determining whether an order placed by a user is potentially erroneous based at least in part on actions previously taken by the user regarding other prior orders, the determining being performed by the configured computing system in a manner that is personalized to the user based at least in part on the previously taken actions, wherein the personalized manner for the user differs from one or more other manners used for other users for determining if distinct orders placed by those other users are potentially erroneous; and
  when it is automatically determined that the order placed by the user is potentially erroneous, automatically notifying the user of the determining for the order to enable the user to provide a response regarding an action to take for the order.

40. The non-transitory computer-readable medium of claim 39 wherein the automatic determining of whether the order placed by the user is potentially erroneous includes determining that the order is potentially erroneous if the order is a duplicate of a prior order that the user previously placed.

41. The non-transitory computer-readable medium of claim 40 wherein the automatic notifying of the user of the determining for the order includes querying the user and obtaining a manual confirmation response from the user to fulfill the order, and wherein the method further comprises automatically initiating fulfillment of the order placed by the user based on the obtained manual confirmation response.

42. The non-transitory computer-readable medium of claim 41 wherein the querying of the user is performed automatically by the configured computing system in a manner specific to the user.

43. The non-transitory computer-readable medium of claim 39 wherein the other prior orders are orders that were previously placed by the user within a specified prior period of time.

44. The non-transitory computer-readable medium of claim 39 wherein the other prior orders are orders previously placed by the user that satisfy one or more specified criteria.

45. The non-transitory computer-readable medium of claim 39 wherein the method further comprises receiving the response from the user and, if the response from the user rejects proceeding with the order, canceling the order.

46. The non-transitory computer-readable medium of claim 39 wherein the method further comprises, before the automatic determining of whether the order placed by the user is potentially erroneous, analyzing manual feedback from one or more users regarding one or more orders placed by those users in order to identify aspects of the orders that assist in predicting whether future orders are potentially erroneous, and wherein the automatic determining of whether the order placed by the user is potentially erroneous is based on comparing aspects of the order to the identified order aspects.

47. The non-transitory computer-readable medium of claim 39 wherein the automatic determining of whether the order is potentially erroneous based at least in part on the actions previously taken by the user regarding the other prior orders includes multiple of comparing types of information in the order and in the other prior orders in a manner specific to the user, of selecting the other prior orders in a manner specific to the user, of comparing in a manner specific to the user one or more of multiple alternative types of ordering processes used to place the order and the other prior orders, and of using one or more preferences previously indicated by the user.

48. The non-transitory computer-readable medium of claim 39 wherein the automatic determining of whether the order placed by the user is potentially erroneous includes automatically analyzing the previously taken actions of the user.

49. The non-transitory computer-readable medium of claim 39 wherein the determining of whether the order is potentially erroneous includes one or more of comparing a subset of information included in the order and in the other prior orders, of comparing a manner of placing the order and the other prior orders, and of determining whether a degree of similarity between the order and one or more of the prior other orders exceeds a specified threshold.

50. The non-transitory computer-readable medium of claim 39 wherein the method further comprises automatically determining whether a distinct potential order that has not yet been placed by the user is potentially erroneous based on one or more of the other prior orders and, if it is determined that the potential order is potentially erroneous, warning the user that the potential order is potentially erroneous.

51. The non-transitory computer-readable medium of claim 39 wherein the automatic determining in the manner personalized to the user of whether the order is potentially erroneous is based at least in part on feedback obtained from the user related to one or more of the other prior orders.

52. The non-transitory computer-readable medium of claim 39 wherein the previously taken actions by the user include providing responses by the user to prior querying for confirmations to proceed with prior orders by the user that were automatically determined to be potentially erroneous.

53. The non-transitory computer-readable medium of claim 39 wherein the previously taken actions by the user include specifying preferences of the user regarding how to perform future automatic determining of whether an order of the user is potentially erroneous.

54. The non-transitory computer-readable medium of claim 39 wherein the method further comprises, before the automatic determining in the manner personalized to the user of whether the order is potentially erroneous, automatically identifying the personalized manner for the user based at least in part on modifying a default manner of determining whether a current order for a user is potentially erroneous.

55. The non-transitory computer-readable medium of claim 39 wherein, if it is automatically determined that the order placed by the user is not potentially erroneous, automatically initiating fulfillment of the order placed by the user without further intervention by the user, the automatic initiating of the fulfillment of the order being performed by the configured computing system.

56. The non-transitory computer-readable medium of claim 39 wherein the computer-readable medium is a memory of the configured computing system, and wherein the contents are instructions that when executed program the configured computing system to perform the method.

57. A computer-implemented method for identifying erroneous duplicate orders, the method comprising:
receiving an indication of a current order placed by a user;
automatically determining whether the current order is a duplicate with one or more prior orders that were previously placed by the user, the automatic determining being performed by one or more configured computing systems;
if it is determined that the current order is not a duplicate, automatically proceeding to fulfill the current order without further intervention by the user, the automatic proceeding being performed by the one or more configured computing systems; and
if it is determined that the current order is a duplicate,
querying the user to obtain manual confirmation before proceeding to fulfill the current order; and
after obtaining the manual confirmation from the user for the current order, automatically adjusting how a future automatic determination of whether an order placed by the user is identified as a duplicate will be performed to reflect a lower likelihood that the user has erroneously placed that order, the automatic adjusting being performed by the one or more configured computing systems.

58. The method of claim 57 wherein the automatic adjusting of how a future automatic determination will be performed of whether a future order for the user is identified as a duplicate includes modifying which types of previously placed prior orders are used for comparison to the future order.

59. The method of claim 57 wherein the automatic determining of whether the current order is a duplicate with one or more prior orders that were previously placed by the user is based at least in part on one or more predetermined criteria for comparing the current order and the one or more prior orders, and wherein the automatic adjusting of how a future automatic determination will be performed of whether a future order for the user is identified as a duplicate includes modifying the criteria used for determining whether the future order is a duplicate with one or more previously placed prior orders.

60. The method of claim 57 wherein the automatic determining of whether the current order is a duplicate with one or more prior orders that were previously placed by the user includes selecting the one or more prior orders based at least in part on prior orders that were placed during a period of time of a predetermined length prior to the current order, and wherein the automatic adjusting of how a future automatic determination will be performed of whether a future order for the user is identified as a duplicate includes modifying the length of the period of time such that the prior orders used for comparison to the future order are prior orders previously placed during a period of time of the modified length prior to the future order.

61. The method of claim 57 wherein the automatic adjusting of how a future automatic determination will be performed of whether a future order for the user is identified as a duplicate includes modifying a manner of querying the user to obtain manual confirmation for the future order.

62. The method of claim 57 wherein the automatic adjusting of how a future automatic determination will be performed of whether a future order for the user is identified as a duplicate includes determining not to query the user to obtain manual confirmation for the future order.

63. The method of claim 57 further comprising, after receiving a manual cancellation of the current order from the user in response to the querying, automatically adjusting how a future automatic determination of whether an order placed by the user is identified as a duplicate will be performed so as to reflect a higher likelihood that the user has erroneously placed that order.

64. A computer-implemented method for identifying erroneous duplicate orders, the method comprising:
receiving an indication of a current order placed by a user;
automatically determining whether the current order is a duplicate with one or more prior orders that were previously placed by the user, the automatic determining being performed by one or more configured computing systems;
if it is determined that the current order is not a duplicate, automatically proceeding to fulfill the current order without further intervention by the user, the automatic proceeding being performed by the one or more configured computing systems; and
if it is determined that the current order is a duplicate,
querying the user to obtain manual confirmation before proceeding to fulfill the current order; and after obtaining the manual confirmation from the user for the current order, automatically adjusting how a future automatic determination of whether any order for any user is identified as a duplicate will be performed to reflect a lower likelihood that that user has erroneously placed that order, the automatic adjusting being performed by the one or more configured computing systems.

* * * * *